2,758,008
Patented Aug. 7, 1956

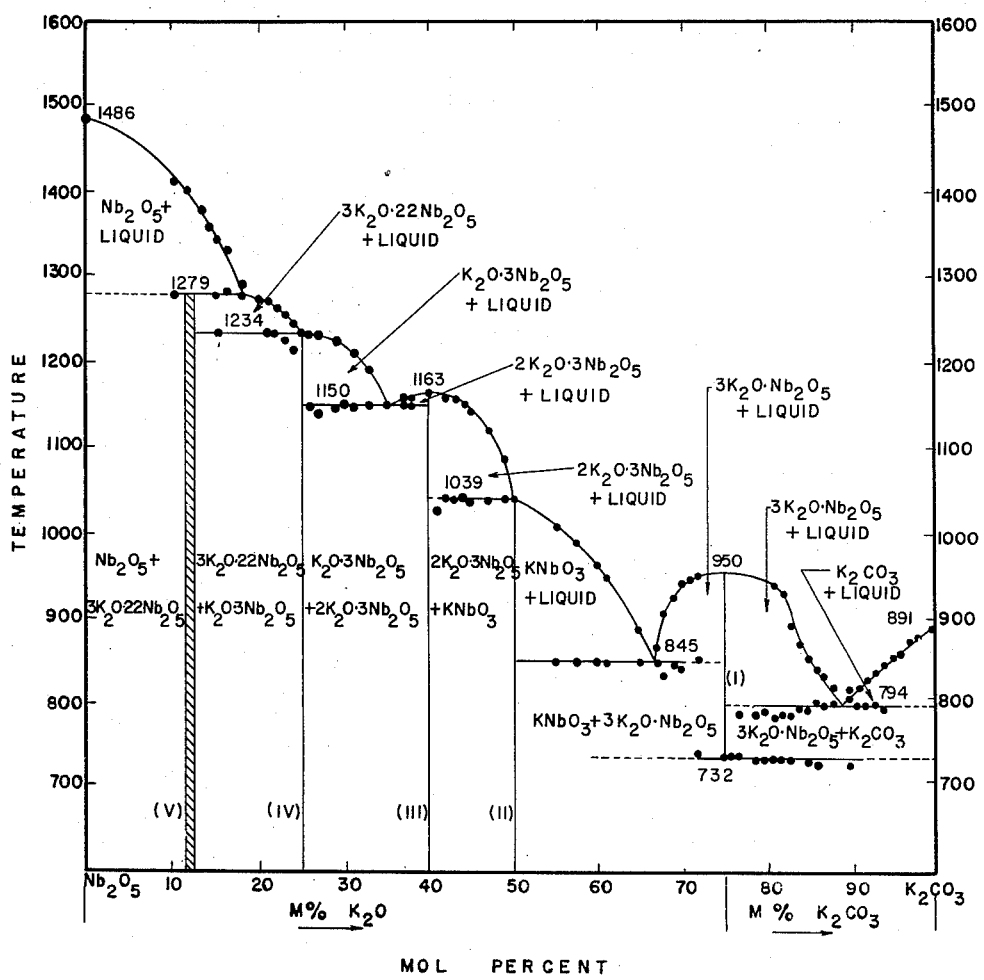

2,758,008

PROCESS OF PREPARING PURE ALKALI METAL NIOBATE

Arnold Reisman and Frederic Holtzberg, New York, and Sol Triebwasser, Brooklyn, N. Y., assignors to International Business Machines Corporation, New York, N. Y., a corporation of New York Application March 24, 1955, Serial No. 496,396

11 Claims. (Cl. 23—51)

The present invention relates to a process of preparing alkali metal niobate and more particularly for preparing such a salt in a very pure form, enabling it to be used for certain purposes for which relatively impure salts of this kind are unsuitable or unsatisfactory for one reason or another.

Alkali metal niobate, such as potassium niobate ($KNbO_3$) or sodium niobate ($NaNbO_3$), also called metaniobates in each instance, are ferro-electric materials, that is, these materials are polarized spontaneously below a certain temperature, sometimes known as the Curie temperature. Further, if a sufficient coercive field is applied to the crystalline material, the molecules of the material will realign themselves in an opposite direction. Ferroelectric materials may be used, by reason of their piezoelectric characteristics, in transducers and practically in the cartridges of phonograph pickups. Thus the material of the present invention has valuable commercial uses as well as having valuable uses as a scientific or research material. Certain of these uses, however, require material of this kind to be of very high purity and particularly require that there be a minimum of oxygen deficiency or, in other words, a minimum of reduced material present. For example, if the material as a whole has an oxygen deficiency only as great as 0.1%, this material will be practically worthless as a ferro-electric material. In contradistinction to this, the material prepared in accordance with the preferred teachings of the present invention has an oxygen deficiency of not over about 0.02%.

The prior art contains a number of teachings of the making of alkali metal niobates, particularly potassium niobate or, as it is sometimes called, potassium metaniobate, ($KNbO_3$). These teachings, as to the physical properties of this material, are somewhat conflicting in character. Some of the teachings tend to show the material to be relatively insoluble in water, while other teachings tend to indicate substantial solubility thereof, for example. It has been found in researches conducted by the present inventors that the fused-solid system $Nb_2O_5$—$K_2O$ contains not merely one, but a number of different compounds of these two oxides. Thus it is believed that the prior art has prepared various different compounds of these possible ones or some mixtures thereof, which in turn has resulted in the several prior researchers arriving at different conclusions as to the properties of the materials which they had and which they thought to be potassium niobate ($KNbO_3$), for example. The phase diagram for the system aforesaid has been accurately determined by the present inventors and accurate means for analysis have been available to them as hereinafter set forth, which now are able to prove the material made in accordance with the present invention to be $KNbO_3$ (as to the potassium salt) and not some other possible compound of $Nb_2O_5$ and $K_2O$ and any mixture of such other compounds with each other or with one of the materials: $Nb_2O_5$ or $K_2O$.

Thus while it is possible that the prior art has produced some $KNbO_3$ or its corresponding sodium salt, it is believed that applicants are the first to have prepared these salts or either of them in an essentially pure state in commercial quantities.

Summarizing the present invention, it comprises the fusing together of starting materials consisting of (a) $Nb_2O_5$ and (b) a salt which will yield $alk_2O$ upon fusion (such as $K_2CO_3$ or $Na_2CO_3$). The "alk" in any event is either sodium or potassium. The fusion is effected under conditions such as to preclude contamination and in proportions carefully calculated so as to coordinate with the phase diagram of the materials present and insure the presence of substantially all of the desired salt with a minimum of any other material. The cooling of the fused mass resulting from the reaction is then carried on at a rate which will permit the re-oxidizing of any small portions of the mass which has been reduced from their maximum oxidized state, thus insuring a minimum of oxygen deficiency, the cooling being, of course, under oxidizing conditions. Below the point at which eutectic solidification takes place, the cooling may be accelerated to a substantial degree, but even here should be slow enough so as preferably not to result in the incidence of such strains in the crystals as will either disrupt them during the cooling due to differential cooling of different parts thereof or which will result in the final product being strained, so as to give undesired properties from certain points of view.

Specifically, the original materials must be put into a crucible of some inert material, such as platinum, with the niobium pentoxide forming the lower layer and the carbonate forming the upper layer. The proportions of these materials prior to the fusion or heating of the contents of the crucible must be within the mol percentages of about 50.05 to about 51 mol percent carbonate, with the balance $Nb_2O_5$. The charge is heated to about 1075° C. and held at this temperature for the completion of the reaction. The resulting material is cooled at a rate of not over about 5° C. per minute to the point of eutectic solidification and thereafter at the rate of preferably not greater than about 15° to 20° per minute, if relatively strain-free material is desired. This constitutes the first phase of the process.

In the event that an even purer material is desired (the material resulting from the first phase being about 99.9% pure), then the second phase of the operation hereinafter summarized is employed. This second phase involves briefly placing the material of the first phase in a crucible as aforesaid as the lower layer and as the upper layer an amount of alkali carbonate, so that (calculated to a basis of $K_2O$ and $Nb_2O_5$) the mol ratio of $K_2O$ to the entire contents of the crucible will be in the range of about 51% to about 66%, preferably in the range of about 54% to about 60% if fine crystals are to be secured and specifically, as to the potassium salt, about 57.5%, these being mol percents in all instances and calculated on the same basis as aforesaid. The heating in this instance is not enough to fuse all the materials present, but is to a temperature about 20° C. below the liquidus temperature and for a time at least about 20 hours. The cooling in the second phase is preferably at not over about 1° C. per minute down to the point of eutectic solidification. If the product need not be strain-free, the subsequent rate of cooling is substantially immaterial and may be the same as in the first phase. If a strain-free product is to be made, then the cooling rate below the eutectic solidification temperature should be about 1°–2° C. per minute with about two hour soaking periods at constant temperature at each of the polymorphic transition points at about 415° C. and about 215° C. for $KNbO_3$.

In both phases, the recovery of the desired salt from the fused mass and the elimination therefrom of water-soluble salts which can act as contaminants is effected by first a leaching operation using an aqueous solution of an alkali carbonate followed by a water wash, the aqueous solution in each instance being preferably about 2% alkali carbonate by weight.

The invention will be better understood by reference to the accompanying drawing, the single figure of which is the phase diagram of the solid-fused system $Nb_2O_5$—$K_2O$ (or $K_2CO_3$) in which the mol percent composition is plotted as abscissae and temperature as ordinates.

Turning now to the details of the present invention, the starting material consists of niobium pentoxide ($Nb_2O_5$), which is commercially available and a high grade, commercially available form of potassium carbonate ($K_2CO_3$), which is preferably dried at about 300° C. for about an hour to remove moisture therefrom.

As above generally set forth, it has been found that the fusion-solid system $Nb_2O_5$—$K_2O$ includes several intermediate compounds or ratios in which these materials apparently react together to form eutectic mixtures. These several possible compounds are as follows (as to the potassium salts in each instance):

(a) $3K_2O \cdot 22Nb_2O_5$
(b) $K_2O \cdot 3Nb_2O_5$
(c) $2K_2O \cdot 3Nb_2O_5$,
(d) $KNbO_3$ (equi-molar proportions), and
(e) $3K_2O \cdot Nb_2O_5$.

Of the above, the compound exclusively desired in a pure state in accordance with the present invention is the compound $KNbO_3$, or its corresponding sodium salt, wherein the constituent materials, $Nb_2O_5$ and $K_2O$ are present in a 1:1 molecular ratio. The starting materials in the proper proportions are placed in a container of inert material.

Let us first consider the proper proportions which must be present in order that the desired result be obtained. These proportions as determined in accordance with the present invention are slightly more than 50 mol percent alkali metal oxide as alk₂O, the excess over 50% preferably being a minimum. The reason for this is that if upon the fusion the proportions of alk₂O to $Nb_2O_5$ ever falls below 50%, there will be produced some of the material $2K_2O \cdot 3Nb_2O_5$ (or the corresponding sodium salt). If any of this 2:3 mol ratio material is produced, it is impossible, in accordance with our present knowledge, to separate it from the desired material (1:1 mol ratio) in accordance with the present invention. It is essential, therefore, that there be a sufficient excess of alk₂O present, so that even upon the volatilization of some of this material during the fusion, the average composition of the melt will never get below the 50 mol percent mark. This accounts for the minimum starting percentage (prior to heating) of 50.05 mol percent, which has been determined as the practical lower limit by experimental work carried out in accordance with the present invention.

From the phase diagram which has been determined exactly as to the potassium salt and which can be determined with equal exactness as to the corresponding sodium salt, it is found to avoid complication on the other side, the mol proportion of $K_2O$ at the start should never exceed about 66%. On the other hand, even when the mol percentage of the starting materials is greater than 50% as aforesaid and approaches 66%, it is found that an increasingly large proportion of the material resulting upon eutectic solidification will be the next material in the diagram, i. e. $3K_2O \cdot Nb_2O_5$ (as to the potassium salt). While it is possible in accordance with the present invention to eliminate a relatively small amount of this material from a relatively large amount of the desired salt ($KnbO_3$ in the case of the potassium salt), the elimination of a relatively large amount of $3K_2O \cdot Nb_2O_5$ is difficult and undesirable. Thus the practical upper limit of the composition of the starting charge as aforesaid in order to avoid obtaining an undesired large amount of the 3:1 mol ratio material is about 51 mol percent. For the same reasons, it is normally preferred not to have more than about 50.5 mol percent alk₂O in the starting material; while the exact preferred proportion is 50.05 mol percent as aforesaid.

The heating of the material to the fusion point is not particularly critical, at least below about 800° C. It is important, however, that the placing of the charge in the crucible at the start of the process shall be with the niobium pentoxide making up the lower layer and the carbonate making up the upper layer. Either a reversal of this order, or an initial mixture of the materials, is undesired as either may result in some spattering and consequent loss of the materials and also may result in undesired reduction of the niobium. It is found that any reduced material, i. e. any reduced niobium compound is very difficult, if not impossible, to remove from the remaining material and gives an impure and discolored product, which is either undesirable or may in some instances even be totally unusable for certain purposes requiring a product of the highest purity.

The material of the container in which the fusion is effected must be inert with respect to anything in the contents thereof. One material which has been found admirably suitable for this purpose is platinum. The use of this material is, therefore, recommended.

It is known that potassium carbonate melts at 891° C., sodium carbonate at 851° C. and $Nb_2O_5$ melts at 1486° C. Therefore, when the temperature of the entire charge is brought up to about 1075° C., which is the desired reaction temperature, it is possible for some of the alkali carbonate to boil off. For this reason, it is necessary at the outset that there be a slight molecular excess of this material, so that during the fusion, the molecular proportions of alk₂O to $Nb_2O_5$ will never be less than 1:1. In this connection, it is also noted for the record that the melting point of pure potassium niobate ($KNbO_3$) is about 1039° C. plus or minus 5° C. (this being about as close as the melting point has as yet been determined).

The reaction occurring in accordance with the present invention during the fusion is as follows:

$$alk_2CO_3 + Nb_2O_5 = 2alkNbO_3 + CO_2$$

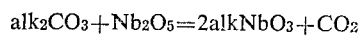

In order that the reaction aforesaid may proceed to completion, it is necessary to give time enough for the completion of this reaction at the higher temperature. This time in practice is about 2 hours, although the exact time is not particularly critical. If sufficient time is not permitted, the reaction will not be complete. On the other hand, if a too great time is allowed, it is possible for some of the alk₂O to vaporize and be lost with the result that the molecular ratio of alk₂O to $Nb_2O_5$ may fall below 1:1. In such an event a certain amount of the undesired 2:3 mol ratio compound may be formed. If this occurs, the entire melt is in effect ruined as it is practically impossible to separate this undesired 2:3 mol ratio material from the desired 1:1 mol ratio material.

The next step in the operation is that of cooling. This must be done under oxidizing conditions and preferably, while some of the material is in liquid form, under such oxidizing conditions coupled with a slow cooling rate, so that any small amounts of the materials present which have been reduced inadvertently to a very slight extent can be reoxidized to their maximum oxidized condition. If the cooling is done slow enough, these slightly reduced portions will be brought, presumably by thermosyphon circulation, to the surface to permit the reoxidation thereof by oxygen contained in the ambient atmosphere at the surface of the melt. Thus the cooling should be done in the presence of air or some oxygen-containing gas, which is otherwise inert, in contact with the melt and at a rate sufficiently slow, while the material in the crucible is even partly molten, so as to permit the reoxidation of any reduced portions of the melt as aforesaid. It has been found that the rate of cooling down to the point of eutectic solidification should not exceed about 5° C. per minute and preferably should be about 2° C. per minute.

Below the point of eutectic solidification, which for the potassium salt (KNbO₃) is about 845° C., the cooling may be substantially accelerated. In the event that it is relatively immaterial if the resulting product is physically strained, then the rate of cooling below the point of eutectic solidification is correspondingly immaterial. In the event a relatively strain-free material is desired, however, the rate of cooling should preferably not exceed about 20° C. per minute and preferably should be in the range of about 15–20° C. per minute.

It has been found that in the cooling during the critical range, i. e. above the point of eutectic solidification, slower cooling than that preferred, i. e. about 2° C. per minute, neither helps nor hurts the quality of the product. Cooling faster than the desired rate, i. e. faster than about 5° C. per minute, results in an increased amount of somewhat reduced material, which is blue in color as distinguished from the light yellow color of the quite pure material. Relatively impure material is practically blue-black in color. Thus color may be used as a practical indicator for showing the amount of reduced material present in the final product. It has further been found, as aforesaid, that when there is an oxygen deficiency (reduced material) in the final product of 0.1% (by weight) or more, this final product then becomes useless as a ferro-electric material. It is also found that when the cooling rate is kept down to about 5° C. per minute during this critical range, the total oxygen deficiency is not over about 0.05%; while a cooling rate as preferred in accordance with the present invention at this stage of the process of about 2° C. per minute gives a final product having an oxygen deficiency of only about 0.02%.

Below the point of eutectic solidification, all the material is in solid form and hence there is no reasonable possibility of reoxidizing any material except that immediately at the surface. Under these circumstances, the cooling rate is not as critical from this point of view.

If the material desired is one which is relatively strain-free, then the cooling rate should not exceed one which will give the desired type material. Two things can happen if the material is cooled too fast in this lower range in which the material is all solid. On the one hand, if the cooling rate is too fast, some portions of the solid material may cool sufficiently faster than others, so that normal contraction on cooling will cause strains in the material to build up to the extent of breaking the material up into smaller portions or particles. On the other hand, in case strains remaining in the material are of importance in the characteristics of the final product, then the cooling rate should be slow enough that the strains will be minimized. On such circumstances, a cooling rate as slow as about 15°–20° C. per minute has been found to be necessary.

Following the cooling of the contents of the container to room temperature, it is removed from the crucible by tapping out and is physically crushed, preferably sufficiently small for practical leach purposes, which may be about 10 mesh size. This material will contain a major proportion of the desired material, alkali metal niobate and a minor proportion of the undesired material, i. e. the 3:1 mol ratio compound, such as

$3K_2O \cdot Nb_2O_5$

If this material were to be washed with water or leaching with pure water attempted at this stage of the process, it is found that the 3:1 mol ratio material, some of which is always present at this stage and which is quite soluble in water, is, however, decomposed to a substantial extent in water, yielding as one of the products of decomposition, $Nb_2O_5$. This material, $Nb_2O_5$, also cannot be practically separated from the desired product in accordance with our present knowledge, so that there results a relatively impure product which is not acceptable for many, if not all, uses for which the desired product is wanted. In order, therefore, to stabilize the relatively small amount of 3:1 mol ratio material which is present as aforesaid against decomposition in water while dissolving it away from the desired alkali metal niobate, it has been found necessary to use an aqueous solution of an alkali carbonate as the leaching solution. It is found that about a 2% (by weight) solution of alkali carbonate serves admirably for this purpose. Leach solutions having less than about 2% of alkali metal carbonate therein are usually undesired by reason of their failure to prevent decomposition of the 3:1 mol ratio material present. On the other hand, more concentrated solutions serve no useful purpose.

Following the leaching operation as aforesaid, it is usually desired to wash the remaining solid material with water, so as to remove traces of alkali carbonate which may adhere to the crystals of the desired product.

The product of this first stage of the process, which has thus far been described in detail, is a crystal mass, which may be physically crushed to provide a powdered material which is about 99.9% pure alkali metal niobate. This material may be considered a final product of the process if the purity thereof and the crystalline form thereof are both sufficient for the purposes for which the material is desired. If, however, it is desired that the material shall be in very fine crystalline form as distinguished from irregular shaped particles resulting from a crushing operation, and if it is at the same time desired that the material shall be substantially free of unreduced material and also substantially strain-free, then the second phase of the process hereinafter described is carried on using as a starting material the product of the first phase prepared as aforesaid.

In the second phase, the product of the first phase is placed again in a container, such as a platinum crucible as aforesaid, and as the lower layer of the charge for this crucible, the upper layer being alkali metal carbonate, using the same alkali metal as in the niobate produced in the first phase, the carbonate layer being on top as in the preparation of the charge for the fusion in the first phase. The crucible with its contents as aforesaid is then heated to a temperature which is approximately 20° below the liquidus temperature for the entire composition in question. This liquidus temperature can, of course, be determined from a knowledge of the composition and from the phase diagram aforesaid, such as has been worked out in detail for the system $Nb_2O_5-K_2O$.

The composition of the material introduced into the second phase, i. e. as supplied to the crucible as the charge for melting is calculated to give a mol ratio of $alk_2O$ to the total mols of $alk_2O+Nb_2O_5$ of about 51% to about 66% and preferably nearer to the lower of these limits. From a somewhat narrower point of view and with the reasons for the limits being substantially the same as in the case of the first phase of the process as to both limits, when it is desired that the final product shall be in fine crystalline form, the mol ratio of $alk_2O$ to the total mols of $alk_2O$ plus $Nb_2O_5$ should be about 54 to about 60 mol percent and more specifically, as to the potassium salt, about 57.5 mol percent. In calculating the actual weights of the starting materials to be used, the desired mol percent of the $alk_2O$ to total mols

$alk_2O+Nb_2O_5$ is first decided upon, then starting with a given weight of say the product of the first phase of the process, the equivalent mols of $Nb_2O_5$ are calculated and the total mols of $alk_2O$ accompanying the $Nb_2O_5$ is also calculated. Sufficient alkali metal carbonate is then added as the upper layer to give the desired mol percentage as aforesaid. The actual weights for a typical run will be given as an example which follows.

The material is held at the temperature aforesaid for a time period sufficient to allow the contents of the crucible to come to substantial equilibrium. As a practical matter, this time is usually at least about 20 hours. It is found that if a lesser time is afforded, the digestive process taking place is not reasonably completed; while if a longer time is provided, the amount of alk$_2$O volatilized is sometimes so great that there is danger of having less than equimolal proportions. This results in the potential formation of the undesired inextricable compound 2K$_2$O·3Nb$_2$O$_5$ or the corresponding sodium salt as aforesaid and hence is to be guarded against. On the other hand, time periods as long as about 48 hours have been tried with substantially equal success, but with no substantially better results than was obtained in about 20 hours. During this period agitation should be minimized.

Following the heat soaking as aforesaid, the contents of the crucible are cooled in a manner generally described for the first phase of the process, except that the cooling rate in this phase of the process is preferably not over about 1° C. per minute during the cooling down to the eutectic solidification point which, as aforesaid, is 845° C. for the potassium salt. Again the reasons for this choice are essentially the same as those given above, except that they dictate this particular cooling rate in this phase of the process to obtain a highly purified product having the characteristics herein outlined. During the second phase, if a strain-free product is not required, the cooling rate below the eutectic solidification point is not critical and the principles set forth as to the first phase may be applied. However, when it is desired to make a product which is not only pure, but also strain-free, then the cooling rate, even below the eutectic solidification temperature should not exceed about 1°–2° C. per minute, with a soaking period of about two hours at constant temperature at each of the polymorphic transition points, which for the potassium niobate (KNbO$_3$) are at 415° C. and 215° C. respectively. Following the complete cooling of the material, it is tapped out of the crucible, leached and washed exactly as described above in connection with the first phase operation and for the same reasons. The final product made in this way is in the form of pale yellow, transparent crystals ranging in size from about 40 mesh to smaller than 400 mesh. It has been found that the crystals of this product thus made have desired characteristics as a ferro-electric material and, further, have clear and sharp X-ray diffraction patterns.

As an example of the two phases of the process, an initial charge calculated to be 50.05 mol percent K$_2$CO$_3$ was prepared using 30.888 grams Nb$_2$O$_5$ and 16.0917 grams K$_2$CO$_3$, weighed to the nearest milligram. These materials were placed as aforesaid in a 60 cc. platinum crucible with the niobium oxide at the bottom of the crucible. The crucible and its contents were covered with a loose fitting platinum cover and placed in a furnace at 800° C. The temperature was slowly raised to 1075° C. and held at this temperature for about two hours to allow for complete evolution of CO$_2$. The furnace was then allowed to cool to room temperature at about 2° C. per minute. The contents of the crucible were tapped out, and crushed sufficiently to pass a number 10 sieve. The coarse mixture was then leached twice for one hour in hot 2% potassium carbonate solution using 400 ml. of solution for 75 grams of charge. The leached niobate (about 41.5 grams) was washed five times with 250 ml. of boiling water to remove carbonate, dried and ground with a mullite mortar and pestle. The product thus far made was the product of the first phase of the process.

The product of the first phase (93.4 grams) was used as one of the starting materials for the second phase of the process and placed as a lower layer in a platinum crucible as aforesaid. On the top of this was placed 12.7 grams K$_2$CO$_3$ which was calculated to give a mol ratio K$_2$O to K$_2$O+Nb$_2$O$_5$ of 57.5 mol percent. The material was raised to about 960° C., which is approximately 20° below the liquidus for this composition and was held there for 20 hours. The final material resulting from the operation of the second phase of the process, carried on as aforesaid, was 83.2 grams, i. e. about 89% of the niobate material supplied to the second phase of the process.

The purity of the material of the present invention has been demonstrated by use of a modification of the method of analysis described by Weiss and Laudecher in Z. Anorg. Chem., 64, 65 (1909) for niobium pentoxide. Starting with a known sample of pure niobium pentoxide to test the efficiency of the analytical method and with five samples, the sample weight checked with the weight found by the use of this analytical method to the fourth decimal place. When using this same method in analyzing the product of the present invention, the theoretical weight (average of four samples) in the analysis of the product of the first phase of the process was as follows:

Theoretical (based on weight of sample and formula KNbO$_3$)=.3995
Weight of Nb$_2$O$_5$ actually found by analysis=.3992.

When the same test was used with the product of the second phase of the process, the theoretical weight of Nb$_2$O$_5$ (average of four samples) was .2914 and the actual weight found was .2913. It is believed that this confirms beyond any reasonable doubt that the material prepared is the equi-molecular compound KNbO$_3$ (as to the potassium salt) as contrasted with any one of the other possible compounds which could have been formed as aforesaid or any contaminated mixture thereof.

While there is herein described but one principal process in accordance with the present invention, which is in two phases and which may be stopped at the end of the first phase if the product of the first phase is satisfactory for a given purpose, various alternatives, particularly as to ranges for certain possible variables, have been indicated as the description proceeded. It is intended, however, that any and all modifications of the present disclosure which may occur to those skilled in the art from the present teachings are to be considered as within the purview of the present invention, which is to be measured by the appended claims.

What is claimed is:

1. The process of preparing substantially pure alkali metal niobate, selected from the group which consists of potassium niobate (KNbO$_3$) and sodium niobate (NaNbO$_3$), comprising the steps of introducing into a container of inert material as starting materials: niobium pentoxide (Nb$_2$O$_5$) and alkali metal carbonate, selected from the group which consists of potassium and sodium carbonates, with the niobium pentoxide initially making up a lower layer of the charge in this container and the carbonate making up the upper layer and sole balance of said charge, and in which these materials are present in the initial charge (prior to heating) in the proportions of carbonate about 50.05 mol percent to about 51 mol percent, with the entire balance consisting of Nb$_2$O$_5$; fusing the charge so prepared by heating said container with the charge therein to about 1075° C. and holding such charge at substantially this temperature for a time sufficient for the substantial completion of the reaction:

$$alk_2CO_3 + Nb_2O_5 = 2alkNbO_3 + CO_2$$

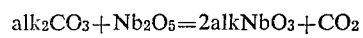

in which "alk" is one of the alkali metals: potassium and sodium; cooling the reaction products in said container under oxidizing conditions and at a rate of not over about 5° C. per minute until all the reaction products in the container have solidified by eutectic solidification, thereafter completing the cooling of the solid material; leaching from the material thus prepared substantially all material other than the desired alkali metal niobate by contacting such material under leaching conditions with an aqueous solution of an alkali metal carbonate which contains at least about 2% by weight of said alkali metal carbonate; and thereafter washing the remaining solid material with water to remove alkali metal carbonate remaining therein from the leaching step aforesaid.

2. The process in accordance with claim 1, in which the concentration of the alkali metal carbonate in said container prior to the heating of the charge therein is from about 50.05 mol percent to about 50.5 mol percent with the balance $Nb_2O_5$.

3. The process in accordance with claim 1 for the making of potassium niobate, in which the alkali metal carbonate used as aforesaid is potassium carbonate and in which this potassium carbonate is present in said container prior to heating as aforesaid in the proportion of about 50.05 mol percent with the balance $Nb_2O_5$.

4. The process in accordance with claim 1, in which the step of cooling the reaction products in said container until all the reaction products have solidified by eutectic solidification is carried on by cooling at the rate of about 2° C. per minute.

5. The process in accordance with claim 1, in which the step of completing the cooling of the solid material following the solidification thereof by eutectic solidification is carried on by cooling at a rate of not over about 15° to 20° C. per minute, so as to produce a product which is substantially strain-free.

6. The process in accordance with claim 1, in which the step of cooling the reaction products in said container until all the reaction products have solidified by eutectic solidification is carried on by cooling at the rate of about 2° C. per minute, and in which the step of completing the cooling of the solid material following the solidification thereof by eutectic solidification is carried on by cooling at a rate of not over about 15° to 20° C. per minute, so as to produce a product which is substantially strain-free.

7. The process in accordance with claim 1 for the making of potassium niobate ($KNbO_3$), in which the alkali metal carbonate in the starting material is potassium carbonate ($K_2CO_3$), in which the materials are present in the initial charge in the proportion of potassium carbonate about 50.05 mol percent with the entire balance consisting of $Nb_2O_5$, in which the step of cooling the reaction products until they are all solidified by eutectic solidification is carried on at the rate of about 2° C. per minute, and in which the subsequent cooling of the solid material below the eutectic solidification point is effected at the rate of about 15° to 20° C. per minute, so as to produce a substantially strain-free product.

8. The process of preparing substantially pure, alkali metal niobate which is substantially free of unreduced material and which is in fine crystalline form, said alkali metal niobate being selected from the group which consists of potassium niobate ($KNbO_3$) and sodium niobate ($NaNbO_3$), comprising as a first phase of the process, the steps of introducing into a container of inert material as starting materials: niobium pentoxide ($Nb_2O_5$) and alkali metal carbonate, selected from the group which consists of potassium and sodium carbonates, with the niobium pentoxide initially making up a lower layer of the charge in this container and the carbonate making up the upper layer and sole balance of said charge, and in which these materials are present in the initial charge (prior to heating) in the proportions of carbonate about 50.05 mol percent to about 51 mol percent, with the entire balance consisting of $Nb_2O_5$; fusing the charge so prepared by heating said container with the charge therein to about 1075° C. and holding such charge at substantially this temperature for a time sufficient for the substantial completion of the reaction:

$$alk_2CO_3 + Nb_2O_5 = 2alkNbO_3 + CO_2$$

in which "alk" is one of the alkali metals: potassium and sodium; cooling the reaction products in said container under oxidizing conditions and at a rate of not over about 5° C. per minute until all the reaction products in the container have solidified by eutectic solidification, thereafter completing the cooling of the solid material; leaching from the material thus prepared substantially all material other than the desired alkali metal niobate by contacting such material under leaching conditions with an aqueous solution of an alkali metal carbonate which contains at least about 2% by weight of said alkali metal carbonate; thereafter washing the remaining solid material with water to remove alkali metal carbonate remaining therein from the leaching step aforesaid; and further comprising as a second phase of the process the steps of placing the product prepared in the first phase aforesaid in a container of inert material as a lower layer, with alkali metal carbonate as an upper layer, these materials being present in the proportions such that the $alk_2O$ present (calculated from that present in the form of $alkNbO_3$ plus that present in the form of $alk_2CO_3$) with respect to the $Nb_2O_5$ (calculated from that present in the form of $alkNbO_3$) is about 51 to about 66 mol percent $alk_2O$ with the balance $Nb_2O_5$ as aforesaid; heating the container and its contents so prepared to a temperature of about 20° C. below the liquidus temperature for the entire composition present in the container and holding the material at this temperature and without agitation for at least about 20 hours; and thereafter cooling the container and its contents under oxidizing conditions and at a rate of not over about 1° C. per minute until all the reaction products in the container have solidified by eutectic solidification, thereafter completing the cooling of the solid material at the rate of about 1°–2° C. per minute with about two hour soaking periods, each at substantially constant temperature, at each of the polymorphic transition points respectively; leaching from the material thus prepared substantially all material other than the desired alkali metal niobate by contacting such material under leaching conditions with an aqueous solution of an alkali metal carbonate which contains at least about 2% by weight of said alkali metal carbonate; and thereafter washing the remaining material with water to remove alkali metal carbonate remaining therein from the leaching step aforesaid.

9. The process in accordance with claim 8, in which the proportions of $alk_2O$ and $Nb_2O_5$ (calculated as aforesaid respectively) at the start of the second phase of the process is from about 54 to about 60 mol percent $alk_2O$ with the balance $Nb_2O_5$ as aforesaid.

10. The process in accordance with claim 8, in which the proportions of $alk_2O$ and $Nb_2O_5$ (calculated as aforesaid respectively) at the start of the second phase of the process is about 57.5 mol percent $alk_2O$ with the balance $Nb_2O_5$ as aforesaid.

11. The process in accordance with claim 8 for making potassium niobate in fine crystalline form which contains a minimum amount of reduced niobium-containing material, in which in the first phase of the process the alkali metal carbonate in the starting material is potassium carbonate ($K_2CO_3$), in which the materials are present in the initial charge in the proportion of potassium carbonate about 50.05 mol percent with the entire balance consisting of $Nb_2O_5$, in which the step of cooling the reaction products of the first phase fusion until they are all solidified by eutectic solidification is carried on at the rate of about 2° C. per minute, and in which the subsequent cooling of the solid material in the first phase below the eutectic solidification point is effected at the rate of about 15° to 20° C. per minute; and in which, in the second phase of the process, the proportions of $K_2O$ and $Nb_2O_5$ (calculated as aforesaid respectively) at the start of the second phase of the process is about 57.5 mol percent $K_2O$ with the balance $Nb_2O_5$ as aforesaid.

No references cited.